March 26, 1940.     A. F. ERICSON     2,195,244
FLUID PUMP
Filed July 14, 1936
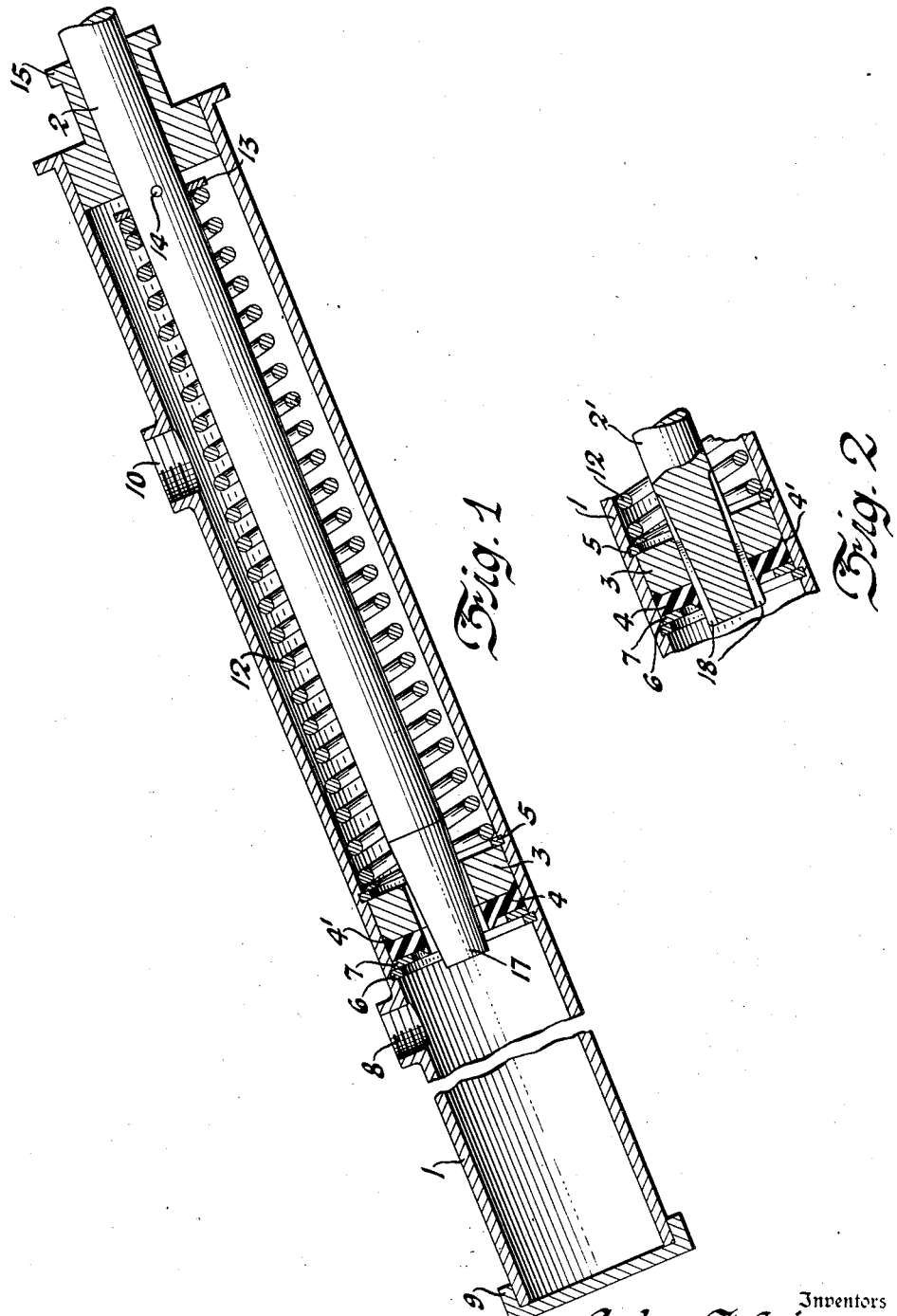
Inventors
Anton F. Ericson
By
Blackmore, Spencer & Flint
Attorney Patented Mar. 26, 1940

2,195,244

UNITED STATES PATENT OFFICE 2,195,244

FLUID PUMP

Anton F. Ericson, Philipsburg, Pa., assignor to General Motors Corporation, Detroit, Mich., a corporation of Delaware Application July 14, 1936, Serial No. 90,499

2 Claims. (Cl. 60—54.6)

This invention relates to fluid displacing mechanism and particularly what is usually described as the master cylinder of a hydraulic brake system.

An object of the invention is to provide a simple and effective direct acting master cylinder.

More specifically the invention aims to prevent the development of air pockets and to prevent fluid leakage.

Furthermore the invention provides for a position of the master cylinder such that fluid in the reservoir part of the system tends to exert pressure on the pressure end of the master cylinder when its displacement rod is released.

Furthermore simplification as compared with prior devices is effected by the absence of mechanical levers in creating the required fluid pressure, the pressure being built up by a simple reciprocating displacement rod.

Other objects and advantges will be understood from the following description.

In the drawing:

Figure 1 is a longitudinal vertical section of the novel master cylinder.

Figure 2 is a section, like that of Figure 1, but showing a modification.

Referring to the drawing, numeral 1 represents the master cylinder for use in a substantially conventional brake system. It is intended that the cylinder shall be mounted at an angle to the horizontal as shown. Reciprocable within the cylinder 1 is a displacement rod marked 2. This rod is used in place of the conventional piston. The rod reciprocates through a guide block 3 positioned adjacent a retaining ring 5 and locked between the ends of the cylinder. The region below the guide block 3 corresponds with the conventional master cylinder in that fluid is forced therefrom through suitable conduits to the wheel cylinders of the brake system. The space above the guide 3 may serve as a reservoir. A seal of rubber or the like is identified by numeral 4. It seats against the guide 3. To effectively prevent leakage between the outer wall of the guide and the cylinder wall the guide is preferably chamfered to receive a marginal projection 4' formed on the rubber seal. A washer 7 rests against the seal and holds it firmly in position through the instrumentality of a snap ring 6 locked in a groove of the cylinder wall. The cylinder is closed at its lower end by a suitable cap 9. The outlet for the discharge of fluid is shown at 8, it being threaded for the attachment of any suitable threaded member. Provision for supplying the reservoir portion of the cylinder with fluid is made in the wall of the cylinder and is identified by numeral 10. At the upper end of the cylinder is a guide and closure cap 15. It is shaped as shown so that it may conveniently hold the end of a dust shield if desired. Within the reservoir portion of the cylinder 1, a spring 12 is shown, this spring being intended to move the rod to its inoperative position. The spring 12 seats against the ring 5 and exerts resilient pressure against a disc 13 held by a pin 14 extending through the rod. The plug or cap 15, when engaged by the pin 14 determines the outermost limit of motion of the rod 2. When the rod approaches the upper limit of its movement a tapered region 17 of progressively lesser diameter and located adjacent the end of the rod passes through the seal and guide 3. In doing so there is an annular passage around the rod and between the rod and guide, the passage being of progressively increasing depth as the rod reciprocates toward its outermost position. Instead of progressively decreasing the diameter of the rod, the rod 2' may be formed with grooves of progressively increasing depths in order to function in a similar manner. The grooved form of the invention is shown by Figure 2 where the grooves are shown as tapered and identified by numeral 18.

Figure 1 shows the device with the parts at rest wherein the displacement rod has been projected to its uppermost limit by the spring 12. In this position fluid is free to flow from the region above the guide 3 through the space between the guide and the tapered end of the piston, or through the tapered grooves in the modified form of rod, to the region below the guide. Also if the rod has been returned to its inoperative position as shown in the drawing before the brake releasing springs have fully released the brakes and returned fluid to the master cylinder, it is possible for fluid to flow from below the guide 3 to the region above the guide. As a result of this idle position of the parts any air in the system is free to make its way to the reservoir. When the brakes are to be used pressure is applied to the outermost end of the rod 2 in any convenient way. The tapered portion of the rod first passes through the seal so that there is no longer any communication between the upper and lower parts of the cylinder. Thereafter further movement of the rod displaces fluid from the lower end of the cylinder through the outlet passage 8. Upon release of manual pressure on displacement rod 2, the spring 12 restores the parts to the position shown and the fluid medium is free to pass to or from the reservoir as conditions require.

Having thus described my invention, what is claimed is:

1. In combination, a master cylinder and hydraulic actuating system, a plug in the upper end thereof, a rod reciprocable within said cylinder, means between the ends of the cylinder to guide said rod, an annular seal, means to secure said seal within the cylinder and in contact with said guide, yielding means to hold said rod in retracted position, said rod having, adjacent its end, a region of progressively lesser diameter, said region being radially within said guide and seal in the retracted position of the rod, said cylinder having an outlet at a point below the seal and an opening for admitting fluid at a point between the plugged end and said seal, said yielding means engaging said guide and also engaging a member carried by said rod, said member adapted to engage said plug.

2. For use with a hydraulic actuating system, a master cylinder, an apertured plug in the upper end thereof, a guide within the cylinder and between the ends thereof, said guide having a marginal bevel, a rubber seal positioned against said guide and having a tapered projection fitting within said bevel, means engaging the cylinder wall to fixedly locate said guide and seal, a rod reciprocable within said cylinder and through said plug, guide and seal, said rod having a tapered region, yielding means to retract said rod upwardly in said cylinder and including a rod carried stop to engage the plug, said tapered region being opposite said guide and seal in the retracted position thereof, said cylinder having an outlet below the seal and an inlet above the seal.

ANTON F. ERICSON.